US005788840A

United States Patent [19]

Lee et al.

[11] Patent Number: 5,788,840

[45] Date of Patent: Aug. 4, 1998

[54] DISPENSING SPIGOT WITH CONTROLLABLE LEVER

[75] Inventors: Deok-Hye Lee, Incheon; Deok-Joong Yoon, Suwon, both of Rep. of Korea

[73] Assignee: Samsung Electronics Co., Ltd., Suwon, Rep. of Korea

[21] Appl. No.: 774,879

[22] Filed: Dec. 27, 1996

[30] Foreign Application Priority Data

Dec. 30, 1995 [KR] Rep. of Korea .................... 95-54910

[51] Int. Cl.[6] .................... B01D 35/027

[52] U.S. Cl. .................... 210/435; 210/455; 210/470; 137/801; 222/189.06; 251/155; 141/207

[58] Field of Search .................... 210/172, 175, 210/257.1, 257.2, 418, 435, 455, 470; 137/527.6, 544, 801; 222/189.06, 189.11, 630, 631, 287, 321.6, 380, 387, 402.15, 469, 472, 473, 475.1, 146.1; 251/101, 78, 103, 107, 114, 155, 215, 228, 231; 141/206, 207, 212

[56] References Cited

U.S. PATENT DOCUMENTS

| | | | |
|---|---|---|---|
| 2,264,671 | 12/1941 | Kocher | 251/155 |
| 3,698,603 | 10/1972 | Radcliffe | 222/146.1 |
| 4,236,553 | 12/1980 | Reichenberger | 141/198 |
| 4,247,134 | 1/1981 | Yergen | 251/155 |
| 4,366,920 | 1/1983 | Greenfield, Jr. et al. | 222/413 |
| 4,880,535 | 11/1989 | Burrows | 210/257.2 |
| 4,915,261 | 4/1990 | Strenger | 222/541 |
| 4,987,926 | 1/1991 | Simmons | 137/625.4 |
| 5,228,486 | 7/1993 | Henninger | 141/206 |
| 5,390,826 | 2/1995 | Burrows | 222/146.6 |
| 5,536,396 | 7/1996 | Mudra et al. | 210/472 |
| 5,562,824 | 10/1996 | Magnusson | 210/472 |

*Primary Examiner*—W. L. Walker

*Attorney, Agent, or Firm*—Burns, Doane, Swecker & Mathis, L.L.P.

[57] ABSTRACT

A water purifier includes a storage vessel for storing purified water. A dispensing spigot is connected to the vessel. The spigot includes a valved body and a lever for operating the valve. The lever can be rotated rearwardly from an "off" position to temporarily dispense water, i.e., to dispense water so long as a rearward force is applied to the lever. When the rearward force is relieved, the level automatically returns to the off position. The lever can also be rotated forwardly from the "off" position to continuously dispense water, i.e., to dispense water until the lever is forcefully rotated rearwardly by the user. A stop pin is removably mounted in the lever to prevent the lever from being rotated forwardly from the "off" position until the pin is removed, thereby preventing the continuous dispensing mode from being accidentally initiated.

5 Claims, 8 Drawing Sheets

DISPENSING SPIGOT WITH CONTROLLABLE LEVER

BACKGROUND OF THE INVENTION

1. Field of the Invention

This invention relates generally to a water dispenser of a water purifier.

2. Description of the Conventional Art

A conventional cold and warm water purifier is generally designed such that water supplied from a faucet is purified after being separated from unknown materials via special filtering means.

The cold and warm water purifier is divided into a natural filtration type, a direct filtration type, an ion exchange resin type and a reverse osmosis type according to purifying manners.

The cold and warm water purifier employing a reverse osmosis type is to purify water by removing heavy metals, bacteria and carcinogenic substance via an artificial osmosis membrane under a predetermined pressure. Also, the water purifier is used to purify water used for washing and cleaning special elements in fields of an ultramodern science or precision science. The water purifier is also used to purify water used for drinking and cooking and the like in view of the environment.

As shown in FIGS. 1 to 3, the reverse osmosis type cold and warm water purifier includes a main body 10 having a front panel 11, a back panel 12, a side panel 13, an upper panel 14 and a lower panel 15.

Water retaining means 16 is located at a middle section of the front panel 11 for retaining water dropped from cold and warm spigots or disposal valves 130,131 and the the water retained at the water retaining means 16 is drained out manually or by a drain hose(not shown) connected to a predetermined portion of the water retaining means 16.

As shown in FIGS. 2 and 3, predetermined spaces E and F are formed at upper and lower sides of the main body 10 by first and second horizontal partitions 20,21.

A third partition 22 is vertically located between the first and second partitions 20,21 so as to provide a special space G at the rear of the main body 10.

A fourth partition 23 is horizontally located at a predetermined height on a front side of the third partition 22 so as to provide predetermined spaces H,I between the first and second partition 20,21.

In a space E, a water storage chamber 30 is disposed on an upper surface of the first partition 20. The water storage chamber 30 is able to hold purified water of desired quantity. Also, a control box 40 for selectively controlling an operation of the water purifier is fixed at one side of the front panel 11.

In a space F, a compressor 50 for compressing a refrigerant to a high temperature and a high pressure state, is mounted on an upper surface of the lower panel 15. A condenser 60 is also mounted at the other side of the upper surface of the lower panel 15. A condenser 60 is able to perform a condensing action on a pressurized refrigerant received from the compressor 50. Cooling means 70 (by way of example, fan, blower, etc.) for cooling, generated between the compressor 50 and condenser 60 is located at a middle section of the upper surface of the lower panel 15.

In a space G, a plurality of filtering means 90 are supported by first and second filter fixing brackets 80,81. Also, a pump 100 is disposed at an upper side of the second partition 21.

As shown in FIG. 4, the plurality of filtering means 90 include a sedimenting filter 91 fixed by a first filter fixing bracket 80 for removing floating materials(rust substances remaining at a water passline) when unpurified water is passed through the pass line, a pre-processing filter 92 for removing unknown materials (for example, chlorine components, etc) of the water via the sedimenting filter 91, a first and a second membrane filter 93,94 for removing various heavy metals or carcinogenic substances contained in the water supplied via the pressurizing pump 100 from the pre-processed filter 92, post-processing filter 95 for removing noxious gaseous components or a bad smell of the water supplied via the first and the second membrane filter 93,94, and, a sterilizing filter 96 fixed by a second filter fixing bracket 81, for sterilizing noxious germs contained in the water after passing the post-processing filter 95.

Hoses 97 for guiding the water are respectively interconnected to the sedimenting filter 91, the pre-processing filter 92, the first and the second membrane filters 93,94, the post-processing filter 95 and the sterilizing filter 96. Also, a concentration water pipe 98 is connected to a lower side of the first and the second membrane filters 93,94 so that concentration (waste) water exhausted from the first and the second membrane filters 93,94 is exhausted to the outside.

In a space H, a warm water container 110 and a cold water container 120 are disposed on an upper surface of the fourth partition 23. After heating or cooling the purified water provided via first and second purified pipes 31,32 from the purified container 30, the warm water container 110 and cold water container 120 store hot water and cold water, respectively.

As shown in FIG. 3, the first purified water pipe 31 is coupled with the bottom surface of the purified water container 30 and the bottom surface of the warm water container 110. A second purified pipe 32 is also coupled with the bottom surface of the purified water container 30 and the cold water container 120.

A heating member 111 is disposed within the warm water container 110. The heating member 111 serves to heat the water contained in the warm water container by way of an external power.

A cooling coil 121 is wound around circumference of the cold water container 120. The cooling coil 121 cools the water contained in the cold water container 120 by way of liquid refrigerant.

Water exhausting pipes 112,122 are respectively coupled with the warm water container 110 and the cold water container 120. The water exhausting pipes 121,122 are connected to warm water and cold water dispensing valves 130,131 projecting through the front panel 11.

As shown in FIGS. 5 and 6, warm and cold water dispensing valves 130,131 include a disposal body 133 having a valve sheet 132 for opening or closing a water passage extending through the body 133. A body 133 is engaged with the water exhausting pipe 112 of the warm water container 110, and is engaged with the water exhausting pipe 122 of the cold water container 120. A cover 134 is engaged with the disposal body 133 for opening and closing an opening(not shown) of the disposal body 133. A dispensing lever 136 is hinged to a hinge shaft 135 of the valve sheet 132 for opening and closing an outlet opening 133*a* of the body 133 by vertically operating the valve sheet 132.

A dispensing lever 136 includes a movable block 136*a* having different widths and lengths so as to move the valve sheet 132 by different amounts depending on the direction of rotation of the lever 136. The lever 136 includes a curved handle **136*b* connected to the movable block 136*a* so as to continuously dispenses purified water when rotated forwardly (see FIG. 6**) and to temporarily dispense purified water when rotated backward according to a pushing force of a container (by way of example, cup, glass or the like).

In a space I, a main PCB(Printed Circuit Board)(140) having various control functions for controlling an operation of the purifier, is disposed on an upper surface of the second partition(21).

When a selecting button(not shown) mounted at the control box 40 is pushed by the user, the pressurizing pump 100 is operated. At this time, the water is purified via a plurality of filtering means 90 under a predetermined pressure according to an operation of the pressurizing pump 100.

When the water supplied from the faucet is passed through the sedimenting filter 91, the floating materials contained in the water are removed. After through passing through the sedimenting filter 91, a chlorine component of the water is also removed by passing through the preprocessing filter 92. Also, the heavy metals and/or carcinogenic substances are removed by passing the water through the first and the second membrane filters 93,94.

When the water is passed through post-processing filter 95 after passing through the first and the second membrane filters 93,94, a bad smell or noxious gas components contained in the water, is removed. Also, noxious bacteria contained in the water is removed in passing the water through the sterilizing filter 96. After the sterilizing filter 96, the water is stored in the purified container 30.

A purified water contained in the purified container 30 is provided to the warm and the cold water containers 110, 120 via the first and the second purified water pipes 31,32, respectively. That is, the purified water which flows through the first purified pipe 31 is continuously provided to a bottom position of the warm water container 110, and the purified water which flows through the second purified pipe 32 is also continuously provided to a top position of the cold water container 120.

When the water is filled in the warm water and the cold water containers 110,120, an operation of the pressurizing pump 100 is stopped according to a sensing signal from a water level protecting sensor(not shown). That is, the water level protecting sensor is adjusted and controlled according to a level of the water to thereby prevent the warm water and the cold water containers 110,120 from overflowing.

When the heater member 111 disposed in the warm water container 110 for providing the warm water is operated, the water is heated to a predetermined temperature. When the compressor 50 is operated for supplying the cold water, vaporous refrigerant gas rendered in a high temperature and high pressure state by a compressing action of the compressor 50 is provided to condenser 60. Also, the refrigerant gas which flows in an inner part of the condenser 60 is condensed by an air blast according to an operation of the cooling means 70.

At this time, the vaporous refrigerant gas having passed through the condenser 60 is turned into refrigerant gas in a high temperature and high pressure state in view of a circumference of the cold and warm water purifier. The refrigerant gas is decreased in pressure through a capillary tube(not shown). The refrigerant gas is expanded through the cooling coil 121 wound around a circumference of the cold water container 120 so that the water contained in the cold water container 120 is cooled.

If the user wants to dispense the warm or the cold water contained in the warm and the cold water containers 110, 120, he or she pushes the lever 136 with a cup(for example, container). When the lever 136 is pushed backward, channels of the disposal valves 130,131 are temporarily opened i.e., so long as the pushing force is applied. During the opening process of the valves 130,131, the warm and the cold water in the warm water and the cold water container is dispensed. If the lever is pulled forwardly, the water is continuously dispensed until the lever is forcefully pushed rearwardly by the user.

In this case, an accident(for example, a burn, etc) can occur due to careless behavior of a child during a continuous dispersing of the warm water contained in the warm water container. Also, water can be wasted by an inexperienced user.

SUMMARY OF THE INVENTION

It is therefore an object of the present invention to provide a selective dispenser of a water purifier for preventing an accident such as a burn from occurring due to a careless act of a child in initiating a continuous water dispensing operation.

It is another object of the present invention to provide a selective dispense of water purifier for preventing a waste of water by an inexperienced user.

According to the present invention, there is provided a selective dispenser of water purification, the dispenser comprising stop means for preventing a dispensing lever from being accidentally rotated forwardly from an off position. The stop means is movable to permit such rotation.

DESCRIPTION OF THE PREFERRED EMBODIMENT

The present invention will now be described in more detail with reference to the accompanying drawings.

Figure 1:
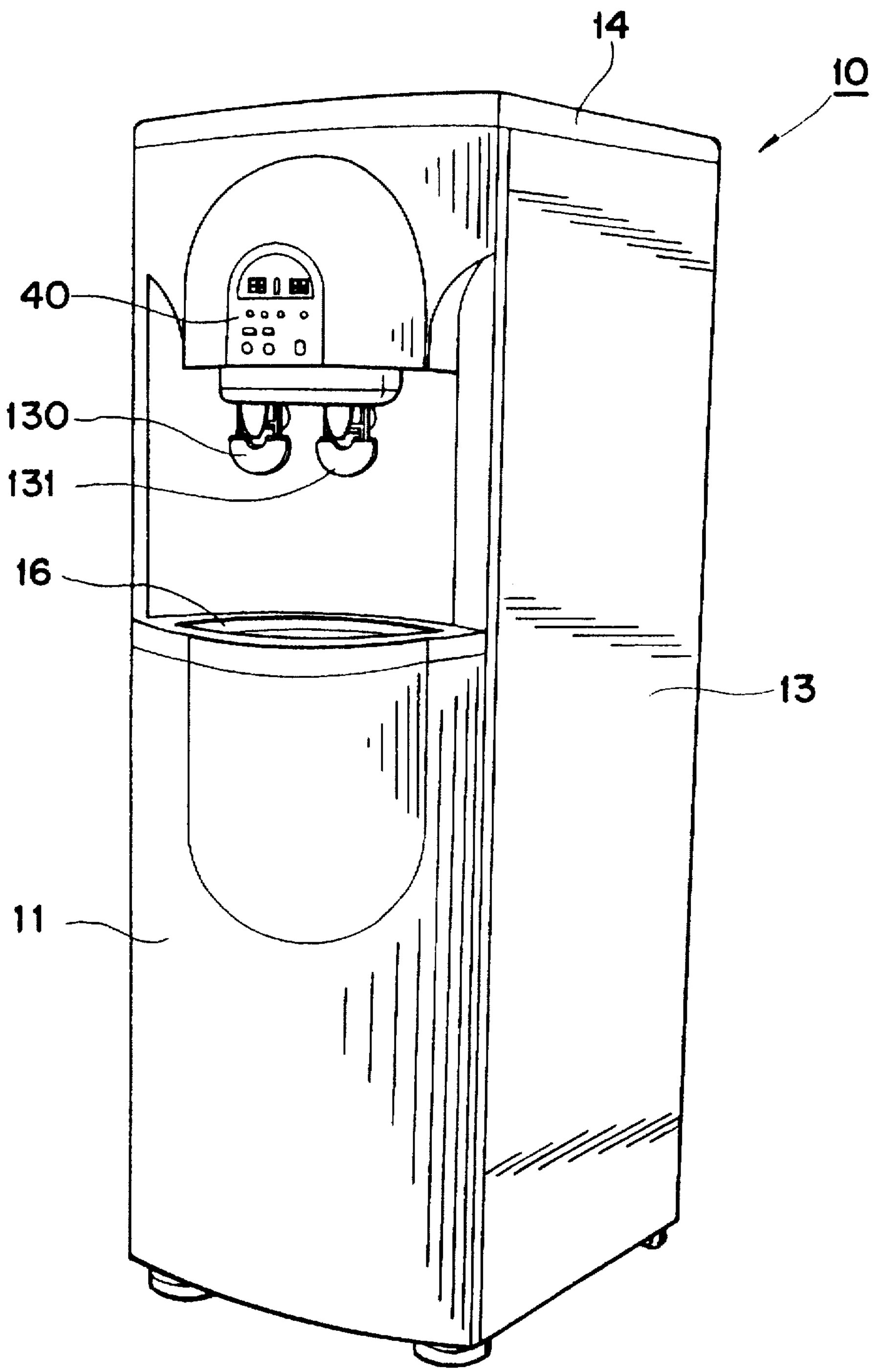
FIG. 1 (PRIOR ART)
FIG. 1 is a perspective view of a conventional cold and warm water purifier.
Figure 2:
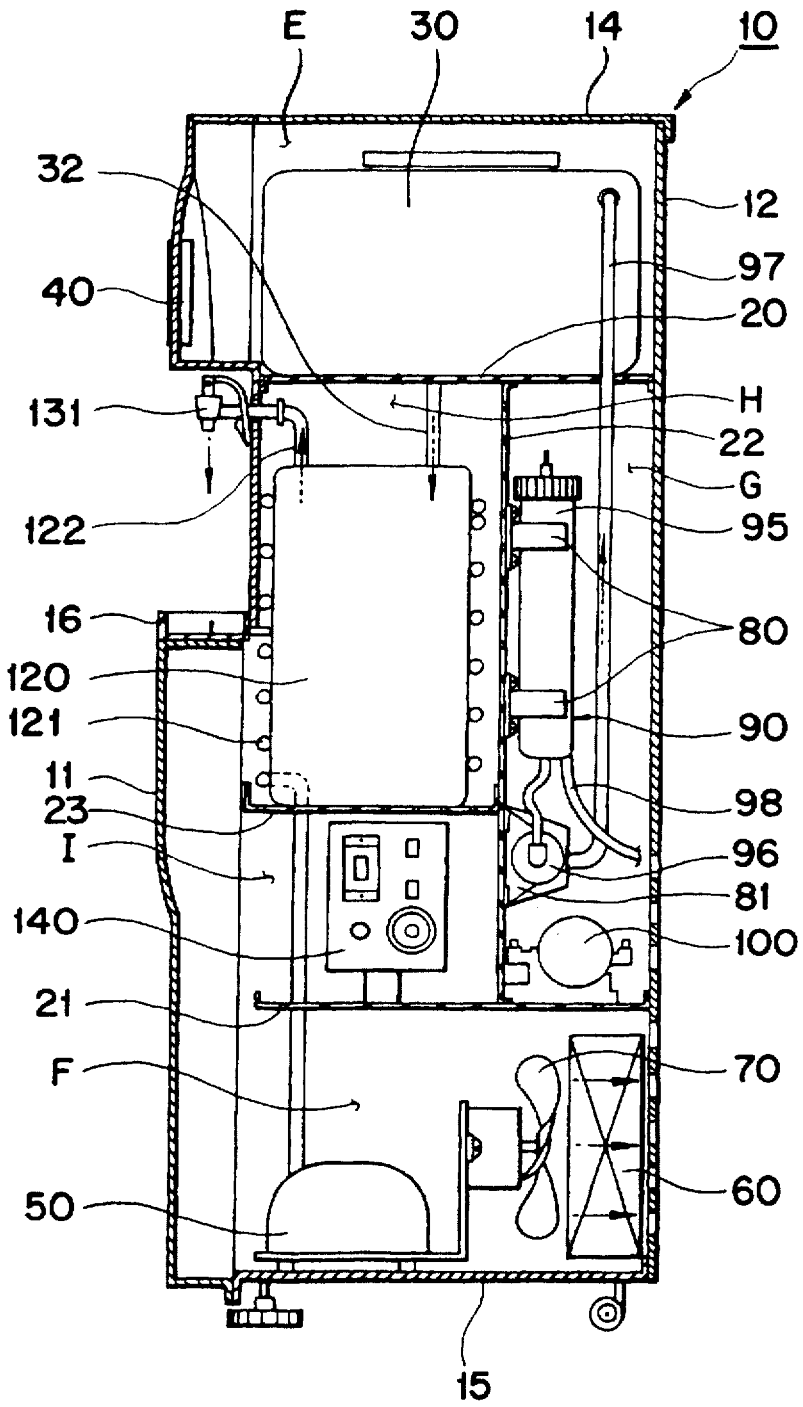
FIG. 2 (PRIOR ART)
FIG. 2 is sectional view showing one side of the conventional cold and warm water purifier.
Figure 3:
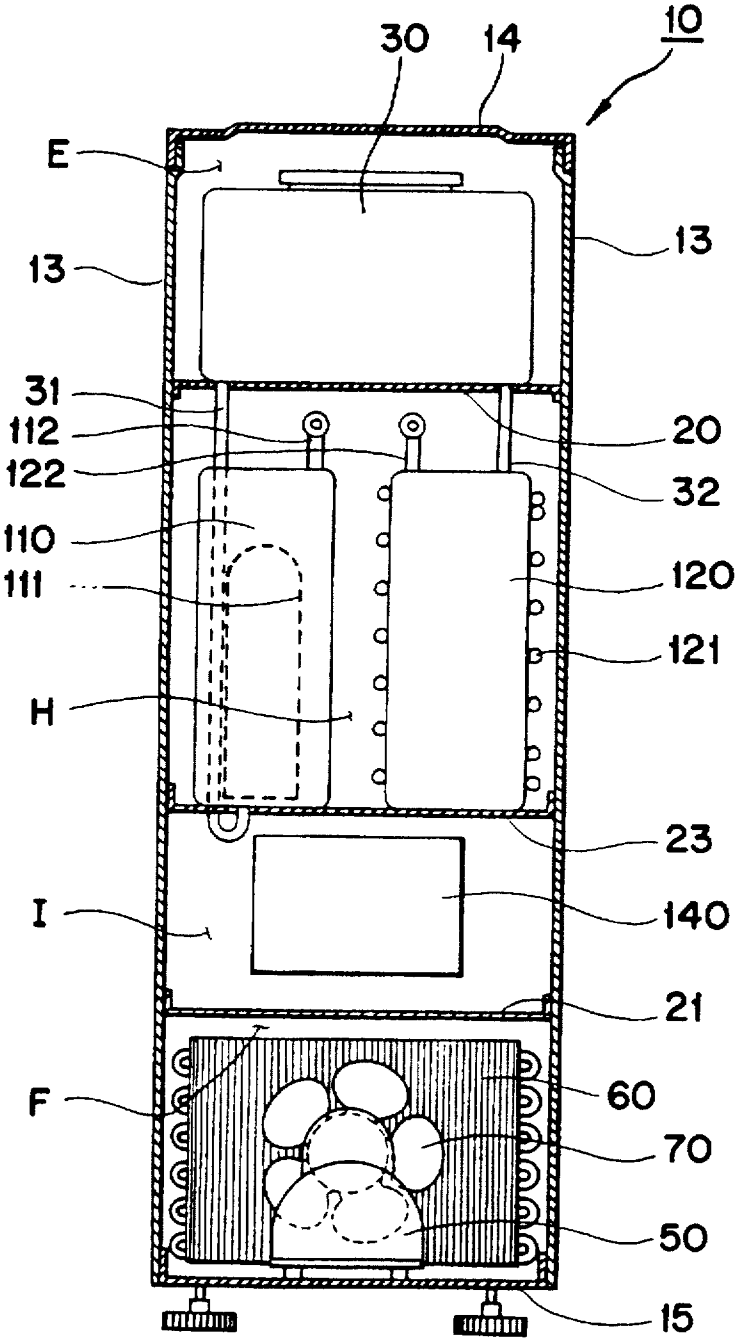
FIG. 3 (PRIOR ART)
FIG. 3 is a sectional view showing a front side of the conventional cold and warm water purifier.
Figure 4:
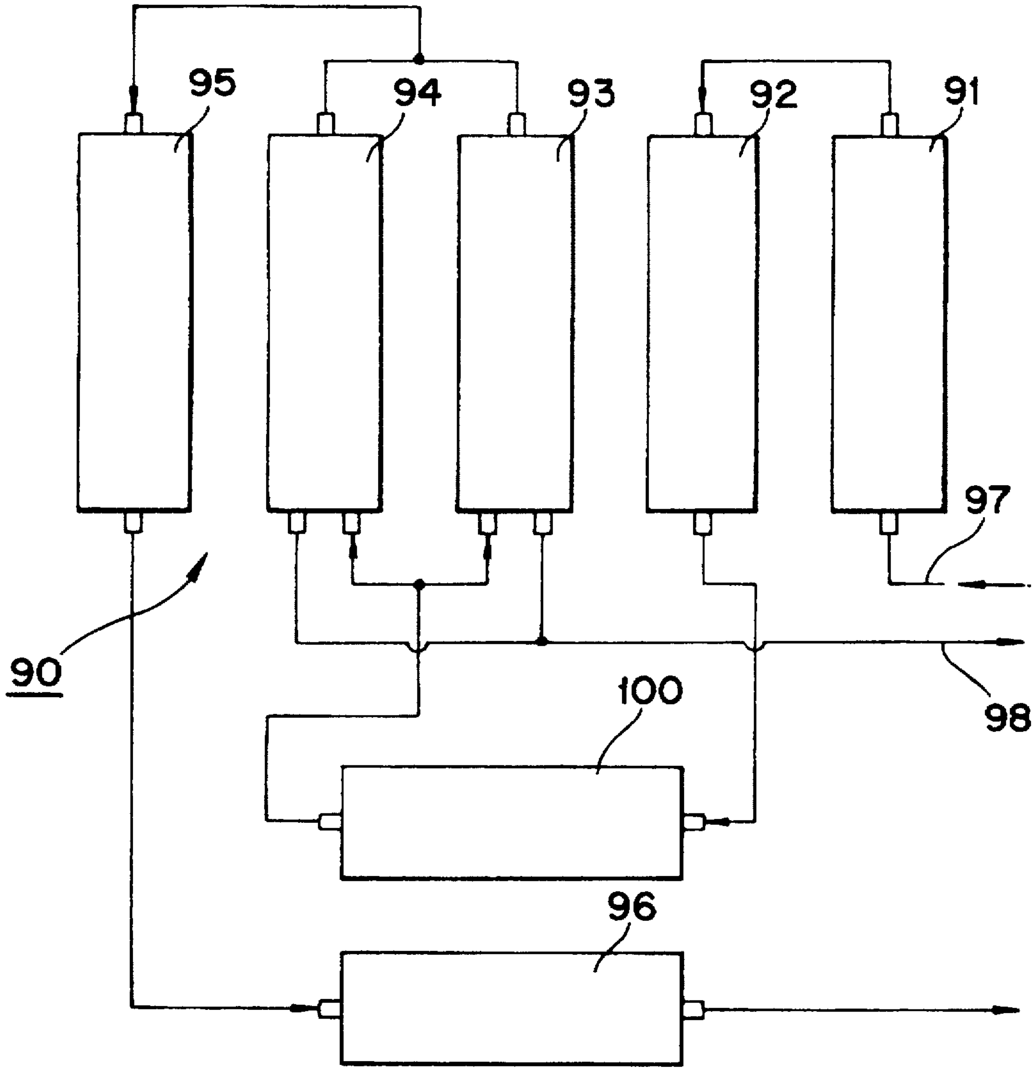
FIG. 4 (PRIOR ART)
FIG. 4 is a schematic diagram showing an arrangement of conventional filter means and pressurizing pump.
Figure 5:
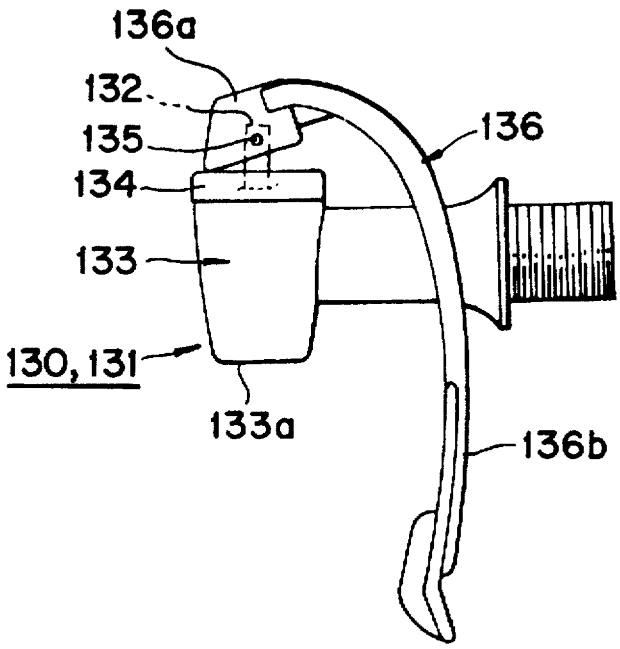
FIG. 5 (PRIOR ART)
FIG. 5 is a side view showing conventional dispensing lever in a temporary dispensing mode.
Figure 6:
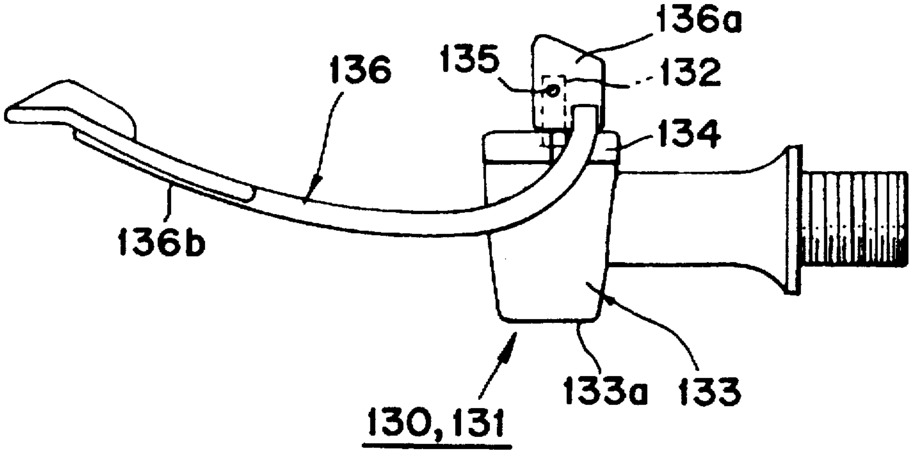
FIG. 6 (PRIOR ART)
FIG. 6 is a side view showing the conventional lever in a continuous dispensing mode.
Figure 7:
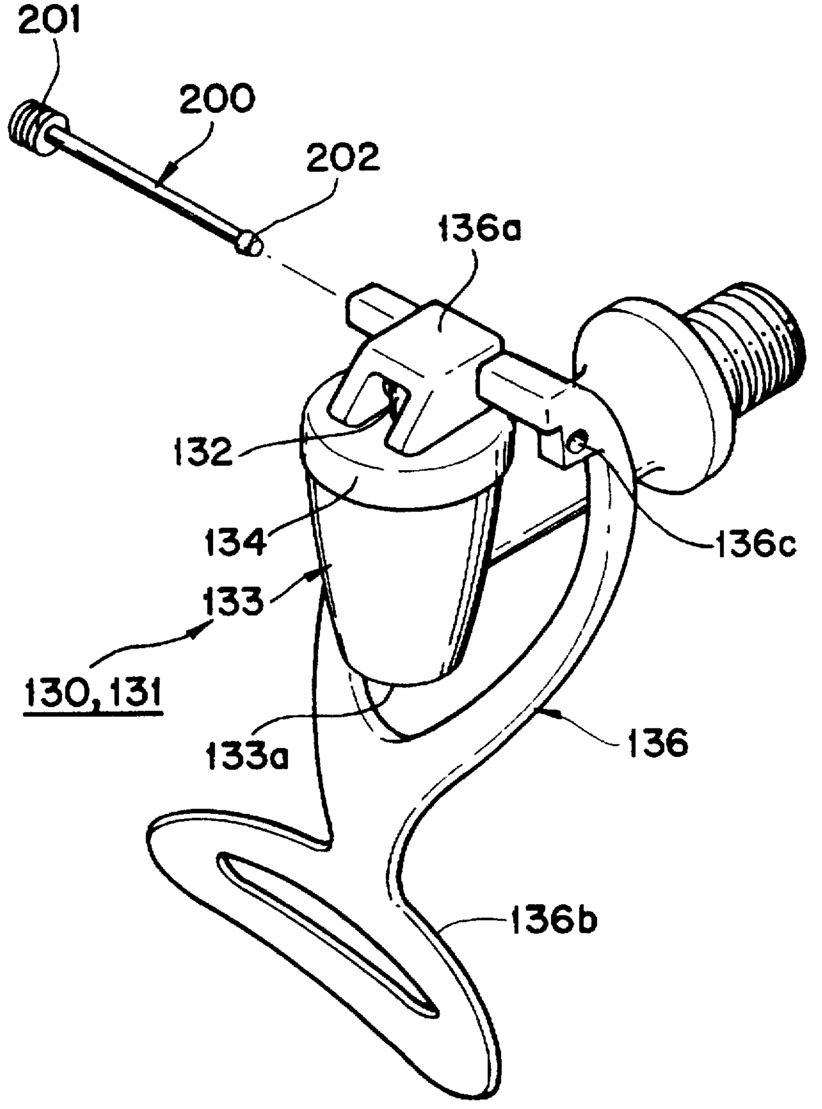
FIG. 7 is an exploded perspective view of principal parts of a dispensing spigot according to the present invention.

In FIG. 7, reference numeral 200 is a removable stop means for preventing rotation of a lever 136 forward to effect a continuous disposal operation while permitting the lever to be rotated backwards.

The locking means 200 is releasably mounted in a hinge hole **136*c* formed in a side portion of the lever 136 so as to regulate forward rotation of the lever 136 by bumping against a back side 133G of the disposal cover 134. Also, the stop means shaped of a pin includes a head portion 201 at one end thereof and an enlarged portion 202** at the other end thereof.

The operation of the selective disposer of the water purifier according to the present invention will be explained with the reference drawings.

Figure 8:
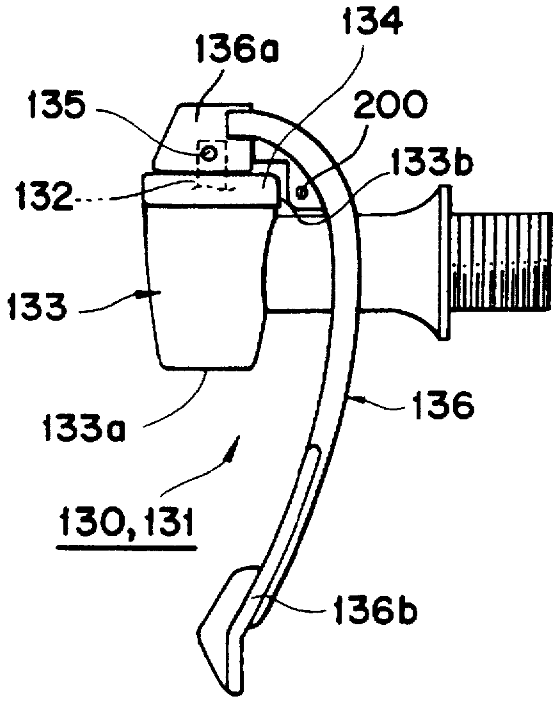
FIG. 8 is a side view showing an off state of dispensing lever of the present invention.
Figure 9:
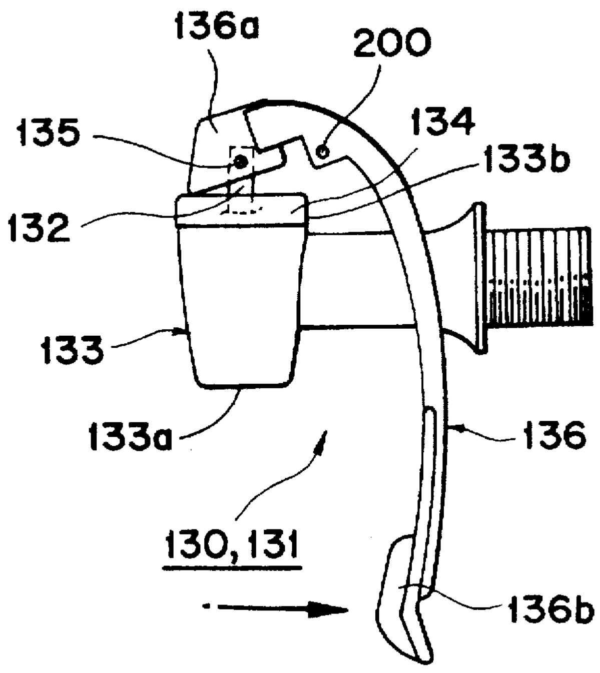
FIG. 9 is a side view showing a temporarily dispensing state of the lever of FIG. 8.

When a container(for example, a cup) is pushed against the lever 136 of the warm water or the cold water disposal valves or spigots 130,131 so as to temporarily dispense warm or a cold water under a state shown in FIG. 8, a water passage of the body 133 is opened by the valve sheet 132 operated upwardly as shown in FIG. 9. That is, the valve sheet 132 is upwardly moved by a movement of the movable block 136*a* by an angle.

When the container is removed, the lever 136 is returned to an original position by a spring(not shown). The pin 200 collides with a circumference of the disposal cover 134 so that the lever 136 is not rotated further forwardly That is, the lever 136 maintains an initial state as shown in FIG. 8. At this time, the water(a warm or a cold water) is not dispensed by.

When the lever 136 is operated by the user for continuously dispensing the warm or the cold water, the pin 200 is separated from the disposal lever 136.

Figure 10:
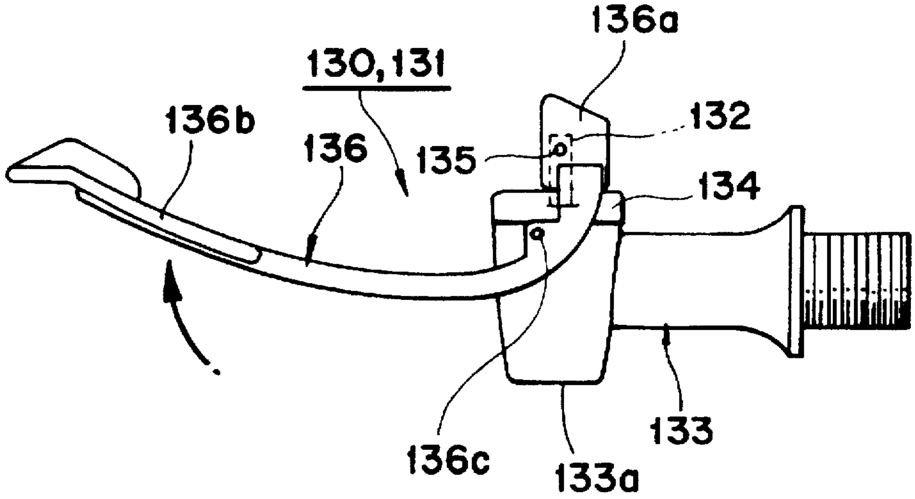
FIG. 10 is a side view showing a continuously dispensing state of the lever of FIG 8.

In a continuous dispensing operation of the warm or the cold water, the movable block 136*a* is disposed at a predetermined position at a right angle by a forward rotation of the lever 136, as shown in FIG. 10.

At this time, the valve sheet 132 is upwardly moved whereby, the water passage is opened by the valve sheet 132 so that the water is continuously dispensed through the hole 133*a*

After finishing a continuous dispensing operation, the lever 136 is pushed backward, as shown in FIG. 8; thus the lever 136 is returned an original position. At this time, the pin 200 is inserted into the hinge hole 136*c* formed in the disposal lever 136.

Therefore, a forward rotation of the lever 136 can be prevented by the pin 200 when the disposal lever is pulled carelessly by a child. Thus, the occurrence of an accident(for example, burn) due to the carelessness of the child, can be prevented.

According to the present invention as described above, the selective disposer of the water purifier is simply operated by the pin means mounted in the disposal lever, thereby preventing an accident resulted from an careless act a child and a waste of water by an inexperienced user Although the invention has been described in its preferred form with a certain degree of particularity, it is understood that the combination and arrangement of parts may be changed without departing from the spirit and the scope of the invention as hereinafter claimed.

What is claimed is:

1. A water purifier comprising:

a housing;

a filtering means within said housing;

a storage vessel containing purified water;

a conduit leading from the vessel;

a valved spigot disposed at an end of the conduit, the spigot including:

a water passage having an outlet, a valve movable for opening and closing the water passage, a lever pivotably mounted to the valve for moving the valve, the lever being rotatable rearwardly from an off position to open the valve so long as a rearward force is applied to the lever, the lever being rotatable forwardly from the off position to open the valve until a rearward force is applied to the lever, and a stop element mounted on the spigot for preventing the lever from being rotated forwardly from the off position, the stop element being manually movable to an inoperative state to permit the lever to be rotated forwardly from the off position.

2. The water purifier according to claim 1 wherein the stop element is movable to the inoperative position by being removed from the spigot.

3. The water purifier according to claim 1 wherein the stop element is mounted in the lever.

4. The water purifier according to claim 3 wherein the stop element is a pin.

5. The water purifier according to claim 4 wherein the pin has first and second enlarged ends.

* * * * *